(12) United States Patent
Burns et al.

(10) Patent No.: US 7,752,117 B2
(45) Date of Patent: Jul. 6, 2010

(54) SYSTEM AND METHOD FOR MONEY MANAGEMENT IN ELECTRONIC TRADING ENVIRONMENT

(75) Inventors: Michael J. Burns, Chicago, IL (US);
Robert A. West, Chicago, IL (US);
Harris Brumfield, Chicago, IL (US);
Peter F. Ziemkiewicz, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 1469 days.

(21) Appl. No.: 10/355,471

(22) Filed: Jan. 31, 2003

(65) Prior Publication Data

US 2004/0153391 A1  Aug. 5, 2004

(51) Int. Cl.
*G06Q 40/00* (2006.01)
(52) U.S. Cl. .................................................. 705/37
(58) Field of Classification Search .................. 705/37
See application file for complete search history.

(56) References Cited

U.S. PATENT DOCUMENTS

| | | | | |
|---|---|---|---|---|
| 4,674,044 | A * | 6/1987 | Kalmus et al. | 705/37 |
| 4,799,156 | A * | 1/1989 | Shavit et al. | 705/26 |
| 5,038,284 | A | 8/1991 | Kramer | |
| 6,408,282 | B1 | 6/2002 | Buist | |
| 6,829,589 | B1 | 12/2004 | Saliba | |
| 7,072,863 | B1 | 7/2006 | Phillips et al. | |
| 7,155,410 | B1 * | 12/2006 | Woodmansey et al. | 705/37 |
| 7,162,447 | B1 * | 1/2007 | Cushing | 705/37 |
| 7,177,833 | B1 | 2/2007 | Marynowski et al. | |
| 7,376,614 | B1 * | 5/2008 | Scheinberg et al. | 705/37 |
| 7,389,263 | B2 * | 6/2008 | Gladstone | 705/37 |
| 7,529,704 | B1 * | 5/2009 | Breslow et al. | 705/37 |
| 2001/0027434 | A1 * | 10/2001 | Alaia et al. | 705/37 |
| 2002/0004774 | A1 | 1/2002 | Defarlo | |
| 2002/0103742 | A1 | 8/2002 | Billing | |
| 2002/0107786 | A1 * | 8/2002 | Lehmann-Haupt et al. | 705/37 |

(Continued)

FOREIGN PATENT DOCUMENTS

WO    WO00/48113 A1    8/2000

(Continued)

OTHER PUBLICATIONS

International Search Report for PCT/US2004/002838.

(Continued)

*Primary Examiner*—Stefanos Karmis
*Assistant Examiner*—Jessica L Lemieux
(74) *Attorney, Agent, or Firm*—McDonnell Boehnen Hulbert & Berghoff LLP

(57) ABSTRACT

A system and method for money management in an electronic trading environment are presented. According to one embodiment, a trader may configure a plurality of filters, each including at least one filter criteria and filter condition. When a money management module detects a new order, the money management module intercepts the order and determines if the order matches one or more predefined filters. If the order matches one or more filters then conditions associated with the applicable filter(s) are applied to the order. The application of one or more conditions to an order may result in sending a modified order, preventing the order from reaching the exchange, or sending order to the exchange without any modifications.

19 Claims, 11 Drawing Sheets

U.S. PATENT DOCUMENTS

| | | |
|---|---|---|
| 2002/0116317 A1 | 8/2002 | May |
| 2002/0133455 A1 | 9/2002 | Howorka |
| 2002/0178099 A1 | 11/2002 | Young |
| 2002/0188544 A1 | 12/2002 | Wizon |
| 2003/0009419 A1 | 1/2003 | Chavez |
| 2003/0041006 A1 | 2/2003 | Bunda |
| 2003/0139989 A1 | 7/2003 | Churquina |
| 2003/0158804 A1 | 8/2003 | Francis et al. |
| 2003/0167146 A1 | 9/2003 | Tezuka et al. |
| 2003/0233325 A1 | 12/2003 | Belyi |
| 2004/0034587 A1 | 2/2004 | Amberson et al. |
| 2004/0153392 A1 | 8/2004 | West |
| 2004/0153393 A1 | 8/2004 | West |
| 2004/0153394 A1 | 8/2004 | West |
| 2006/0195386 A1 | 8/2006 | Glodjo |
| 2006/0247997 A1 | 11/2006 | West |
| 2006/0259396 A1 | 11/2006 | Burns |
| 2006/0259401 A1 | 11/2006 | West |
| 2006/0259402 A1 | 11/2006 | West |

FOREIGN PATENT DOCUMENTS

| | | | |
|---|---|---|---|
| WO | WO00/65510 A1 | 11/2000 | |

OTHER PUBLICATIONS

International Search Report for PCT/US04/002843.

GL Trade, GL Trade User Guide V4.60 LIFFE Connect for Futures, Jun. 1999, London, United Kingdom.

* cited by examiner

MONEY MANAGER 400

FILTER CRITERIA 402

| 406 | 408 | 410 | 412 |
|---|---|---|---|
| CME | ESDEC02 | Buy | — |
| ☆ | ☆ | ☆ | Net > 15 |
| ☆ | ☆ | Sell | — |
| ☆ | ☆ | ☆ | Net < -15 |
| — | — | — | — |
| — | — | — | — |
| — | — | — | — |

CONDITIONS 404

| LIMIT | OVERRIDE |
|---|---|
| Max 5 | Max 5 |
| Max 0 | Max 0 |
| Max 5 | Max 5 |
| Max 0 | Max 0 |
| — | — |
| — | — |
| — | — |

FIG. 4

MONEY MANAGER 500

FILTER CRITERIA 502

| 506 | 508 | 510 | 512 |
|-----|-----|-----|-----|
| CME | ESDEC02 | Buy From | To |
| ☆ | ☆ | 0 | 1000.0 |
| ☆ | ☆ | 1000.0 | 1500.0 |
| ☆ | ☆ | 1500.0 | ∞ |
| — | — | — | — |
| — | — | — | — |
| — | — | — | — |
| — | — | — | — |

CONDITIONS 504

| LIMIT | OVERRIDE |
|-------|----------|
| — | — |
| -1 | -1 |
| Max 5 | Max 5 |
| Max 0 | Max 0 |
| — | — |
| — | — |
| — | — |

FIG. 5

MONEY MANAGER 700

FILTER CRITERIA 702

| 708 | 710 | 712 | 714 |
|---|---|---|---|
| CME | ESDEC02 | Buy Sell | <500 |
| ☆ | ☆ | Buy Sell | 500 |
| ☆ | ☆ | Buy Sell | 1000 |
| ☆ | ☆ | Buy Sell | 2000 |
| ☆ | ☆ | Buy Sell | 3000 |
| ☆ | ☆ | Buy Sell | — |
| — | — | — | — |
| — | — | — | — |

PROFIT CONDITIONS 704

| LIMIT | OVERRIDE |
|---|---|
| Max 3 | Max 3 |
| Max 5 | Max 5 |
| Max 7 | Max 7 |
| Max 10 | Max 10 |
| Max 13 | Max 13 |
| — | — |
| — | — |
| — | — |

LOSS CRITERIA/CONDITIONS 706

| |
|---|
| -100(0) |
| 250(0) |
| 750(1), 400(0) |
| 1500(5), 1000(1), 750(0) |
| 2000(8), 1500(5), 1250(3), 1000(0) |
| — |
| — |
| — |

FIG. 7

MONEY MANAGER 800

FILTER CRITERIA 802

| 808 | 810 | 812 | 814 |
|---|---|---|---|
| CME | ESDEC02 | Buy Sell | <500 |
| ☆ | ☆ | Buy Sell | 500 |
| ☆ | ☆ | Buy Sell | 1000 |
| ☆ | ☆ | Buy Sell | 2000 |
| ☆ | ☆ | Buy Sell | 3000 |
| ☆ | ☆ | Buy Sell | — |
| ☆ | ☆ | Buy Sell | — |
| — | — | — | — |

CONDITIONS 804

| LIMIT | OVERRIDE |
|---|---|
| Max (3, 10) | Max 3 |
| Max (5, 15) | Max 5 |
| Max (7, 20) | Max 7 |
| Max (10, 25) | Max 10 |
| Max (13, 30) | Max 13 |
| — | — |
| — | — |
| — | — |

FIG. 8

MONEY MANAGER 900

FILTER CRITERIA 902

| 908 | 910 | 912 | 914 |
|---|---|---|---|
| CME | ESDEC02 | Buy Sell | <500 |
| ☆ | ☆ | Buy Sell | 500 |
| ☆ | ☆ | Buy Sell | 1000 |
| ☆ | ☆ | Buy Sell | — |
| ☆ | ☆ | Buy Sell | — |
| ☆ | ☆ | Buy Sell | — |
| ☆ | ☆ | Buy Sell | — |

PROFIT CONDITIONS 904

| LIMIT | OVERRIDE |
|---|---|
| Max 5 | Max 5 |
| Max 10 | Max 10 |
| Max 20 | Max 20 |
| — | — |
| — | — |
| — | — |
| — | — |

LOSS CRITERIA/CONDITIONS 906

| |
|---|
| (5,10), -25(5,0) |
| (10,20), 20%(5,10), 50%(5,0) |
| (20,30), 20%(15,25), 50%(5,0) |
| — |
| — |
| — |
| — |

FIG. 9

MONEY MANAGER 1000

| FILTER CRITERIA 1002 | | | PROFIT CONDITIONS 1004 | | LOSS CRITERIA/CONDITIONS 1006 |
|---|---|---|---|---|---|
| 1008 | 1010 | 1012 1014 | LIMIT | OVERRIDE | |
| CME | ESDEC02 | Buy Sell <500 | Max 5 | Max 5 | (5,10), -25(5,0) |
| ☆ | ☆ | Buy Sell 500 | Max 10 | Max 5 | (10,20), Δ 100(5,10) Δ 200(5,0) |
| ☆ | ☆ | Buy Sell 1000 | Max 7 | Max 7 | (20,30), Δ 200(15,25) Δ 500(5,0) |
| ☆ | ☆ | Buy Sell — | — | — | — |
| ☆ | ☆ | Buy Sell — | — | — | — |
| ☆ | ☆ | Buy Sell — | — | — | — |
| ☆ | ☆ | Buy Sell — | — | — | — |
| — | — | — | — | — | — |

FIG. 10

SYSTEM AND METHOD FOR MONEY MANAGEMENT IN ELECTRONIC TRADING ENVIRONMENT

FIELD OF INVENTION

The present invention is directed towards electronic trading. More specifically, the present invention is directed to tools for trading tradeable objects that can be traded with quantities and/or prices.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions, and without the need to make personal contact with a broker. Sometimes, electronic trading systems are also convenient for brokers or other market participants on the floor at an exchange for receiving market information.

Electronic trading is generally based on a host exchange, one or more computer networks, and client devices. In general, the host exchange includes one or more centralized computers to form the electronic heart. Its operations typically include order matching, maintaining order books and positions, price information, and managing and updating a database that records such information. The host exchange is also equipped with an external interface that maintains uninterrupted contact to the client devices and possibly other trading-related systems.

Using client devices, market participants or traders link to the host exchange through one or more networks. A network is a group of two or more computers or devices linked together. There are many types of wired and wireless networks such as local area networks and wide area networks. Networks can also be characterized by topology, protocol, and architecture. For example, some market participants may link to the host through a direct connection such as a T1 or ISDN. Some participants may link to the host exchange through direct connections and through other common network components such as high-speed servers, routers, and gateways. The Internet, a well-known collection of networks and gateways, can be used to establish a connection between the client device and the host exchange. There are many different types of networks and combinations of network types known in the art that can link traders to the host exchange.

Regardless of the way in which a connection is established, software running on the client devices allows market participants to log onto one or more exchanges and participate in at least one market. A client device is a computer such as a personal computer, laptop computer, hand-held computer, and so forth that has network access. In general, client devices run software that creates specialized interactive trading screens. Trading screens enable market participants to obtain market quotes, monitor positions, and submit orders to the host.

Generally, when an order is submitted to a host exchange, the host checks the limits of the order, for example price and quantity, and prioritizes the order with other orders of the same price. When buy and sell order prices cross in the market, a trade occurs and information of which is then relayed in some fashion to the client devices. In fact, the host exchange publishes a data feed to the client devices so that the traders can have access to the most current market information.

Market information commonly includes information regarding the inside market and market depth. The inside market is the lowest sell price in the market and the highest buy price in the market at a particular point in time. Market depth refers to quantity available at the inside market and can refer to quantity available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for an infinite number of price levels, while some provide only quantities associated with the inside market, and others may provide no market depth at all. Additionally, host exchanges can offer other types of market information such as the last traded price (LTP), the last traded quantity (LTQ), and/or order fill information.

To profit in electronic markets, market participants must be able to assimilate large amounts of data, including market information provided by an exchange, and react accordingly more quickly than other competing market participants. Further, because the electronic trading offers tools that enable traders to react to the market so much faster than in the traditional pit environment, a trader may risk and loose a lot of money so much faster. It is therefore desirable to offer tools that can assist a market participant in adapting his or her trading strategy to an electronic marketplace, help the participant to make desirable trades, as well as provide means for money management.

BRIEF DESCRIPTION OF THE DRAWINGS

Example embodiments of the present invention are described herein with reference to the following drawings, in which:

FIG. 4 is a block diagram illustrating one example money management interface through which a user may establish net position-related filter criteria and filter conditions;

FIG. 5 is a block diagram illustrating one example money management interface through which a user can establish price-based filter criteria and filter conditions;

FIG. 7 is a block diagram illustrating one example money management interface through which a user can establish profit and loss related filter criteria and conditions;

FIG. 8 is a block diagram illustrating one example money management interface via which a user may define profit and loss related filter criteria controlling trader's net position- and maximum quantities-related filter criteria;

FIG. 9 is a block diagram illustrating a money management interface via which a trader may define filter criteria for controlling order quantities and a trader's net position that a trader is allowed to hold based on a trader's current profit/loss;

FIG. 10 is a block diagram illustrating another example money manager interface via which a trader may define filter criteria for controlling order quantities and a trader's net position that a trader is allowed to hold based on a trader's current profit/loss according to another example embodiment.

DETAILED DESCRIPTION

I. Money Management Overview

As described with reference to the accompanying Figures, the present invention provides a system that preferably operates as money management tool by dynamically modifying an order to prevent or reduce losses or increase profit in a market. That is, it preferably operates as a trader's conscience or an automatic trading tool that prevents a trader from losing money by restricting certain orders from being sent to the exchange and/or by modifying the orders before they are sent to the exchange. By reducing the potential losses that might have been caused by such unchanged orders, a trader or trading house can benefit with increased profits. Additionally, the system can be programmed to dynamically loosen the restrictions set on certain orders when the trader or automatic trading tool is making money. Advantages, including those described directly above, will become readily apparent to one skilled in the art upon reading the description herein.

Generally, according to a preferred embodiment, a trader or some automatic trading tool sends an order to buy or sell a tradeable object, which is defined below, to an exchange. Preferably, the system intercepts the order and attempts to match it to one or more specific filters, which have been set by an individual. If the order matches a filter then a condition that corresponds to that filter is applied to the order. The order can match with one or more filters. This preferred process may result in sending a modified order to the exchange, preventing the order from reaching the exchange, or sending the order to the exchange without any modifications. This preferred process is described below with reference to the accompanying figures.

II. Hardware and Software Overview

Figure 1:
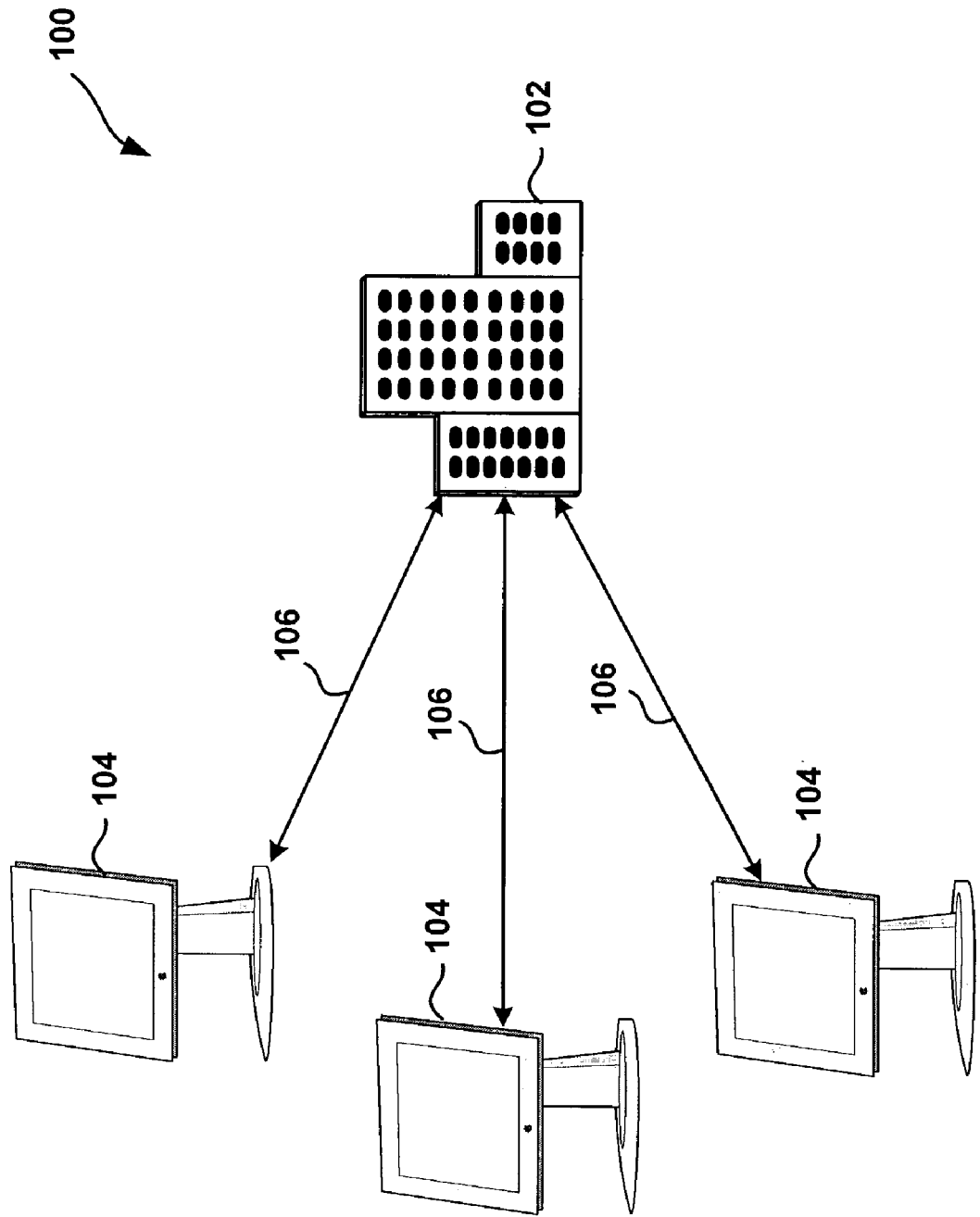
FIG. 1 is an example of a network configuration for a communication system utilized to access one or more exchanges.

FIG. 1 is a block diagram that illustrates an electronic trading system 100 in accordance with the preferred embodiment. System 100 includes at least one host exchange 102 and one or more client devices 104. Intermediate devices such as gateways, routers, and other such types of network devices may be used to assist client device 104 and host exchange 102 in communicating over network(s) 106. Intermediate devices, additional host exchanges, and additional client devices are not shown in the FIG. 1 for sake of clarity. It should be understood, however, that other types of network configurations known in the art may be used as system 100.

A. Host Exchange

Host exchange 102 may include the Chicago Board of Trade ("CBOT"), the New York Stock Exchange ("NYSE"), the Chicago Mercantile Exchange ("CME"), the Xetra (a German stock exchange), or the European derivatives market ("Eurex"). Host exchange 102 might also refer to other systems, from basic to more complex systems, which automatically match incoming orders. These example host exchanges and other host exchanges are well known in the art. Communication protocols required for connectivity to one of these host exchanges are also well known in the art.

As described in the background, a host exchange can implement numerous types of order execution algorithms. The present invention can work with any particular order execution algorithm, and therefore the present invention should not be limited to any type of order execution algorithm. However, for sake of illustration, some example order execution algorithms include first-in-first-out and pro rata algorithms. The first-in-first-out (FIFO) algorithm, used by Eurex for example, gives priority to the first person to place an order. The pro rata algorithm, used by Eurex, for example, takes into account each book order at the inside market price according to its percentage of the overall volume bid or offer at that price level, regardless of its time stamp, thus, avoiding an imbalance in priority between orders with small and large quantities.

Regardless of the type of order execution algorithm used, each host exchange including host exchange 102 preferably provides similar types of information to subscribing client devices 104. The information that the host exchange 102 provides is referred to hereinafter as market information. Market information may include data that represents just the inside market, where the inside market is the lowest sell price (best offer or best ask) and the highest buy price (best bid) at a particular point in time. Market information 108 may also include market depth. Market information can contain other types of market information such as the last traded price (LTP), the last traded quantity (LTQ), and/or order fill information. The contents of market information are generally up to the host exchange 102.

As previously described, the preferred embodiment may be used to trade any tradeable object. As used herein, the term "tradeable object," refers simply to anything that can be traded with a quantity and/or price. It includes, but is not limited to, all types of tradeable objects such as financial products, which can include, for example, stocks, options, bonds, futures, currency, and warrants, as well as funds, derivatives and collections of the foregoing, and all types of commodities, such as grains, energy, and metals. The tradeable object may be "real", such as products that are listed by an exchange for trading, or "synthetic", such as a combination of real products that is created by the user. A tradeable object could actually be a combination of other tradeable object, such as a class of tradeable objects.

B. Client Device

In the preferred embodiment, client device 104 is a computer that provides an interface to trade at host exchange 102. An example client device is a personal computer, laptop computer, hand-held computer, and so forth. Client device 104, according to the preferred embodiment, includes at least a processor and memory. The processor and memory, which are both well-known computer components, are not shown in the figure for sake of clarity. Memory may include computer readable medium. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as a storage device. Volatile media may include dynamic memory, such as main memory or RAM (random access memory). Common forms of computer-readable media include, for example, a floppy disk, a flexible disk, a hard disk, a magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

In the preferred embodiment, client device 104 receives market information 108 from host exchange 102. The market information is received over network(s) 106. Network(s) 106 may include a group of computers and/or associated devices that are connected by communications facilities. Network(s) 106 can involve permanent connections, such as cables, or temporary connections made through telephone or other communication links. Network(s) 106 can be as small as a LAN (local area network) consisting of a few computers, printers, and other devices, or it can consist of many small and large computers distributed over a vast geographic area (WAN or wide area network), or it can consist of both types of networks (both LAN and WAN).

According to the preferred embodiment, market information is displayed to the trader on client device 104. Preferably, the market information, or a portion thereof, is arranged using techniques described herein and is displayed on the visual output device or display device of the client device 104. The output device can be any type of display. For example, the display could be a CRT-based video display, an LCD-based or a gas plasma-based flat-panel display, or some other type of display. The present invention is not limited to any type of display.

Upon viewing market information or a portion thereof, a trader may wish to send transaction information to host exchange 102. To do so, the trader may input the transaction information into the client device by typing into a keyboard, through a mouse, or some other input device. Preferably, transaction information includes an order to buy or an order to sell a tradeable object. An order has two parameters, price and quantity, but of course, the present invention is not limited to a particular number of parameters that may be used to characterize the order. According to another embodiment, transaction information might also refer to other order related transactions such as delete order messages, cancel and replace messages, and so forth. There are many different types of messages and order types that can be submitted to host exchange 102, all of which are considered various types of transaction information. Then, transaction information is sent from client device 104 to host exchange 102 over network(s) 106.

As previously described, FIG. 1 provides an example system overview according to a preferred embodiment. Various changes and/or modifications may be made to the system and still fall within the scope of the present invention. For example, it should be understood that the present invention is not limited to any particular network architecture or configuration such as described in FIG. 1. The present invention may be applied with utility on any electronic device in any network that can be used for electronic trading.

III. Money Management

Figure 2:
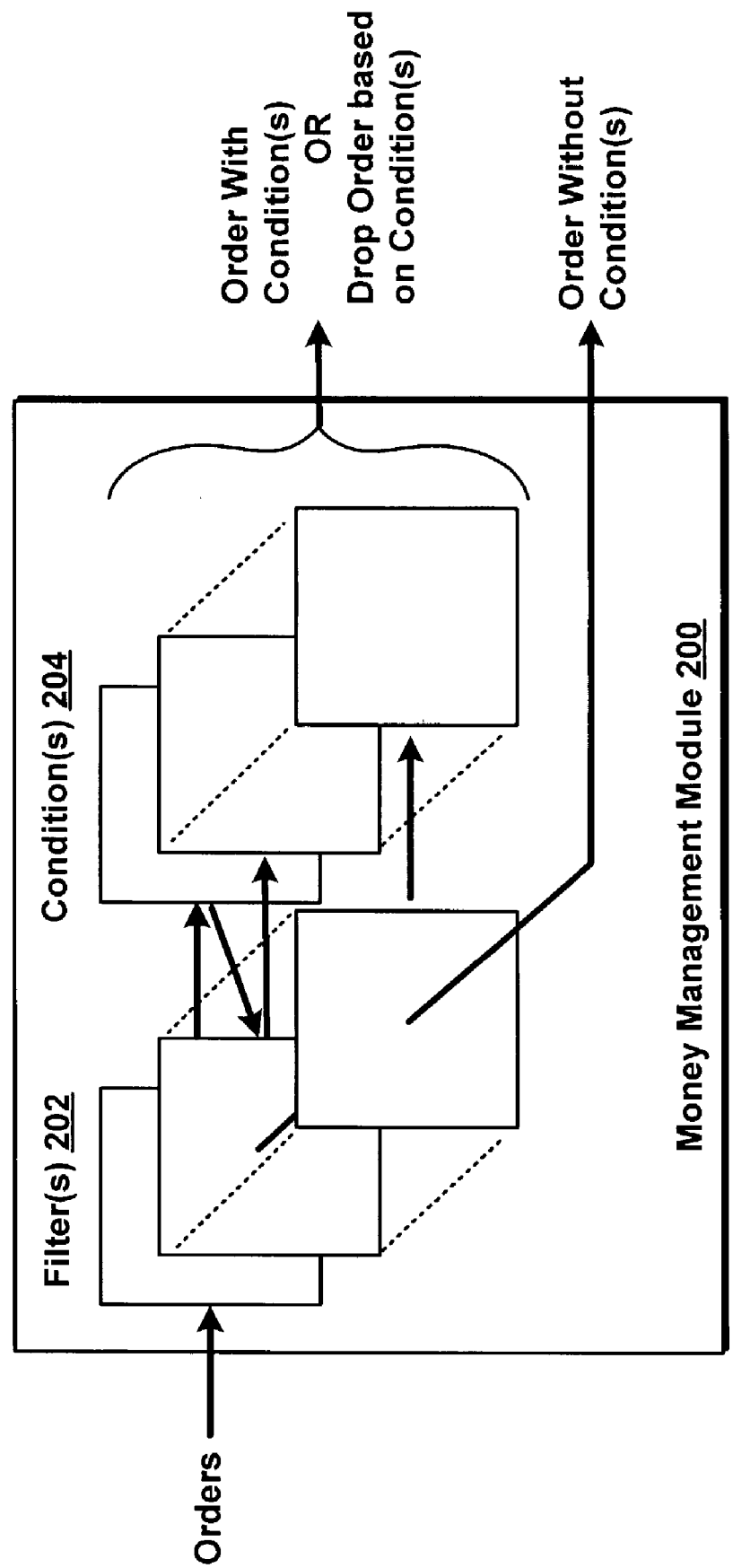
FIG. 2 is a block diagram illustrating an example of a money management module that may be used for money management in an electronic trading environment.

FIG. 2 shows an example overview of the money management module 200, referred hereinafter interchangeably as a money management application, of the preferred embodiment. Money management module 200 may be implemented on any type of computing device. In the preferred embodiment, the money management module 200 is implemented on client device 104. Alternatively, the money management module 200 is implemented on a computing device such as a gateway, for example.

Money management module 200 primarily includes one or more filters 202. Each filter is made up of certain filter criteria that is preferably set by an individual, such as by a trader himself or by an administrator. For example, the filter criteria might include criteria based on an order itself, such as the exchange name, a tradable object, a type of order, e.g., whether the order is a buy or sell order, a range of price levels, or a range of quantities. Additionally, the filter criteria might include criteria based on factors other than those related to the order, such as, for example, trader's profit or loss, last traded price, last traded quantity, theoretical values, or other variables. In such an embodiment, filter criteria may be determined dynamically and may be based on trader-related data or order data, e.g., order data being sent from a client device to an exchange or order-related data that is received from the exchange in a data feed. For instance, dynamic filter criteria may include a trader's net position, a total working buy/sell quantity, or a total filled buy/sell quantity. Further, for instance, filter criteria may be based on any user-configurable equations that may include a plurality of user-configurable factors, such as factors that are based on data available from an exchange, for example. It should be understood that many other filter conditions are possible as well, and filter criteria may be user configurable.

Further, each filter is associated with one or more filter conditions 204. Thus, according to an example embodiment, if an incoming order matches a certain filter, money management module 200 applies filter conditions associated with the matched filter to the incoming order. This process, as will be described in greater detail below, may result in sending a modified order to an exchange. For example, a certain condition associated with a filter, when applied to the order, may result in modifying one or more order parameters, such as increasing or decreasing order quantity. Alternatively, an application of a certain filter condition may result in preventing the order from reaching the exchange. Further, alternatively, a filter condition may result in sending the order to the exchange without modifying any order parameters.

It should be understood that the money management module 200 may enable a user, such as a trader or a risk administrator, to configure filters as well as any filter conditions for each filter via a graphical user interface. In such an embodiment, the graphical user interface may provide a trader with a list of filters so that when a trader selects one of the filters from the list, a second graphical user interface may be displayed, via which the trader may define any desired filter conditions for that filter. Alternatively, a single interface may be used that enables a trader to select any desired filters as well as to define filter conditions. Further, alternatively, a trader may define filters and/or filter conditions using a spreadsheet application that may be linked to the graphical user interface or money management module 200. In such an embodiment, for example, a filter condition may in a format of an equation, and a trader may enter the equation or change any variables in the equation using the spreadsheet.

When a trader uses a spreadsheet, it should be understood that any desirable data exchange protocol could be used to embed information from the third party software to the money management module 200 or to the graphical user interface that is used to define filters and filter conditions. For example, Microsoft OLE 2.0 may be used to perform these functions when using Microsoft windows applications as the third party software. In one embodiment, Microsoft OLE 2.0 may be used to provide a link between any filter condition and a cell from a Microsoft EXCEL spreadsheet. Data exchange protocols in general, and linking and embedding techniques in particular, are well known to those skilled in the art. Further, it should be understood that every time a variable in the equation changes, the spreadsheet application or any other third party software may dynamically calculate a new value for a filter condition associated with the equation. Thus, when an order matches a certain filter associated with such an equation, the money management module 200 may apply the up to date filter conditions as calculated and provided by the spreadsheet application.

It should be understood that an individual trader can uniquely set filters and filter conditions to suit his or her individual trading risk strategies. In one embodiment, the trader could program the money management filters and conditions in a variety of ways and at any time, such as before trading begins or on the fly. Alternatively, a system administrator, who oversees a number of traders, for example, may set up a number of filters and filter conditions for that group of traders or for individual traders, thus creating a money management program that can minimize loss and/or maximize profit of the group of traders. Then, when a trader inputs a new order, the money management module 200 can execute the program by applying the pre-configured filters and filter conditions to the order. The following flow chart illustrates one example method that may be performed by the money management module 200 to manage monetary risk in an electronic trading environment.

Figure 3:
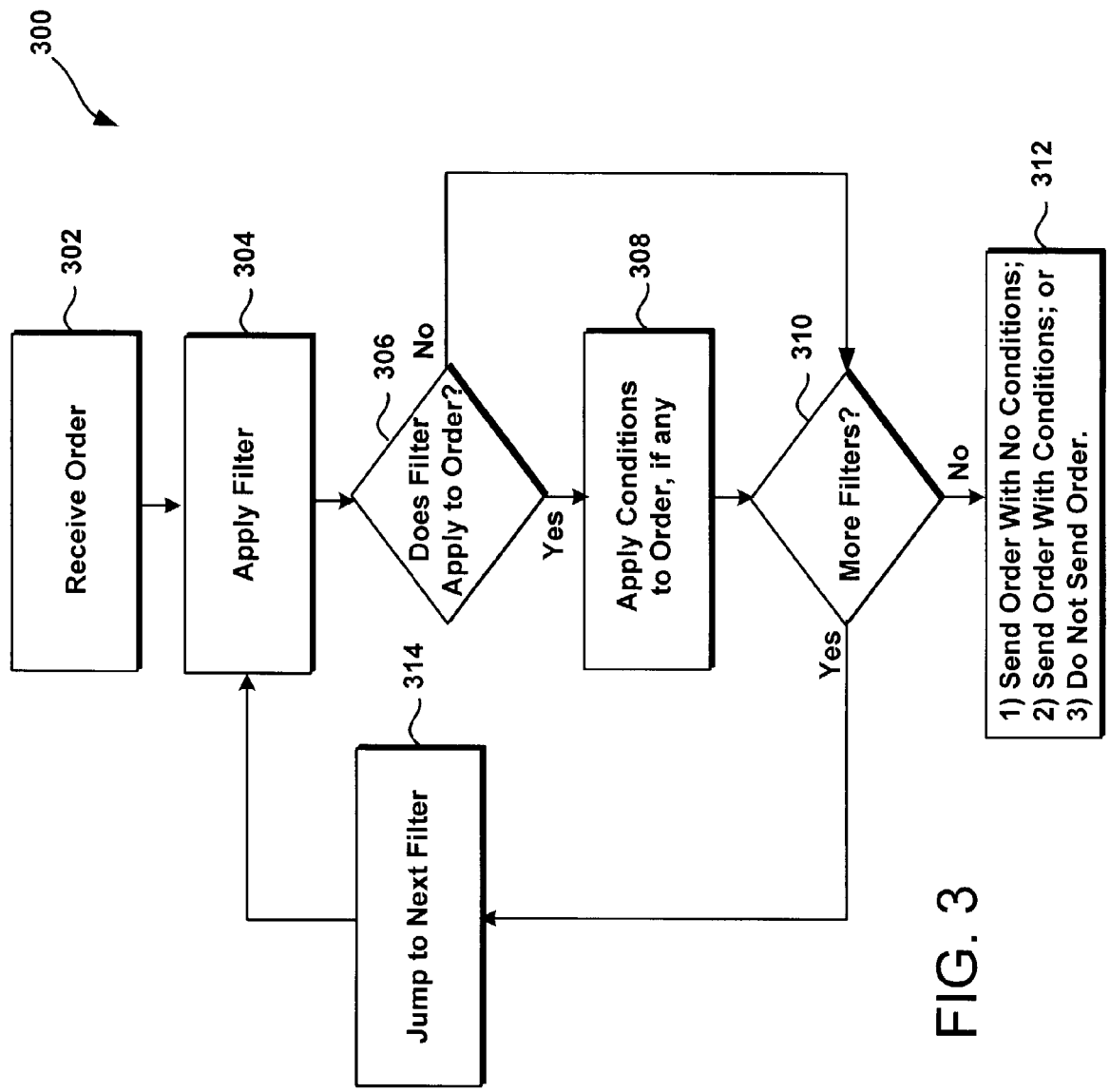
FIG. 3 is a flow chart illustrating a method for money management in an electronic trading environment according to one example embodiment.

FIG. 3 is a flow chart illustrating a method 300 for money management in an electronic trading environment. According to an example embodiment, the money management module 200 may perform the method 300. The example method 300 includes receiving an order at step 302, applying a first filter at step 304, determining if the filter is applicable to the order at step 306, then, if the filter is applicable, applying conditions associated with the filter at step 308, and determining if there are any other filters to be applied to the order at step 310. If there are any other applicable filters, the method 300 includes retrieving the next filter at step 314, and then repeating steps 304, 306, 308, and 310 until there are no more filters that are applicable to the order. If there are no more filters, the method 300 includes, at step 312, processing the order based on the applied conditions.

At step 302, money management module 200 detects a new order being placed by a trader. It should be understood that a trader may input a new order using many different trading applications and interfaces. In one embodiment, a trader may use a commercially available trading application, X_TRADER® from Trading Technologies International, Inc. of Chicago, Ill., that allows the trader to trade in a system like the one shown in FIG. 1. X_TRADER® also provides an electronic trading interface, referred to as MD Trader™, in which working orders and/or bid and ask quantities are displayed in association with a static axis of prices. Portions of the X_TRADER® and the MD Trader™-style display are described in U.S. patent application Ser. No. 09/590,692, entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, and U.S. application Ser. No. 10/125,894, entitled "Trading Tools for Electronic Trading," filed on Apr. 19, 2002, the contents of which are incorporated herein by reference.

However, the preferred embodiments are not limited to any particular product that allows a trader to input orders and trade in the system like the one shown in FIG. 1. Further, it should be understood that money management module 200 and a trading application may share the commonly used information so that, for example, money management module 200 may have access to any data provided via data feeds from an exchange, such as information related to any fills related to orders submitted by a particular trader, and also to any data entered by a trader via a trading application interface.

When the new order is detected, at step 304, money management module 200 may access a set of pre-configured filters and then may apply a first filter to the order. It should be understood that a filter may include one or more filter criteria, such as, for example, a trader's identifier, a predetermined tradable object, a type of the order, e.g., a buy or a sell, or any other trader-related filter criteria such as criteria related to trader's performance, for example. Then, at step 306, money management module 200 determines if one or more criteria associated with the first filter apply to the received order. It should be understood that a filter may include one or more user configurable criteria. If a filter includes a plurality of criteria, the order preferably matches all identified filter criteria for the filter to be applicable.

If the filter applies to the order, at step 308, money management module 200 applies one or more conditions associated with the filter to the order parameters. For example, the application of a filter condition to an order may result in decrementing or incrementing the quantity associated with the order when the order is submitted to the exchange. If the money management module 200 determines that the first filter does not apply to the order, the method 300 continues at step 310, and the money management module 200 determines if there are more filters to be applied to the order. If there are any other filters, at step 314, money management module 200 selects a next filter from the list of filters, and the method 300 continues at steps 304, 306, 308, and 310. It should be understood that if two or more filters are associated with the same condition imposing different restrictions, such as, for example, decreasing order quantities to two different values, the lowest order quantity imposed by the applicable conditions could be used to modify the quantity in the original order. It should be understood that a trader or an administrator may configure certain rules that may govern conditions to be applied to the order if there is a conflict between the conditions imposed by two different filters. In such an embodiment, if there is a conflict between applying two or more conditions to an order, a pre-configured rule may determine which condition, if any, should be applied to the order.

Referring back to step 310, if there are no more filters applicable to the order, at step 312, money management module 200 applies to the order parameters any conditions imposed by the filter(s). Once the money management module 200 applies the applicable filters to an incoming order, the order may be sent to the exchange. As illustrated in FIG. 3, at block 312, sending the order to the exchange may involve sending the original order with no conditions, e.g., the order with its non-modified order parameters, or sending the original order with conditions, e.g., the original order having one or more of its order parameters modified based on the conditions of the applicable filter(s). Further, alternatively, the application of filter conditions may result in not sending the order to the exchange, e.g., effectively preventing the order from reaching the exchange.

According to example embodiments and as mentioned in preceding paragraphs, a trader or an administrator may define filters and directly input filter conditions via one or more user programmable interfaces. The following figures illustrate example filters and filter conditions that may be defined by a trader. However, it should be understood that filters and filter conditions given below are only examples, and those skilled in the art will recognize that modification or changes within the scope of the present invention may be made without departing from the spirit thereof. Further, it should be understood that the present invention is not limited to the number of filters or filter conditions presented in each figure, nor is it limited to the example layouts shown in the subsequent figures. Further, the money manager interface may be configured in a variety of different ways according to the user's preferences.

FIG. 4 is a block diagram illustrating one example graphical money manager interface 400 through which a trader can establish, edit, delete, and save filters and filter conditions that characterize his/her money management strategy. The money manager interface 400, also referred to hereinafter as a money manager window, may be displayed on the screen of the client device 104. According to an embodiment illustrated in FIG. 4, a trader may use the interface 400 to define a number of filter criteria including a name of the exchange 406, a name of tradable object 408, a type of order 410, e.g., buy or sell, and another criteria that, in this example, include a trader-related criterion, e.g., a trader's net position 412. In the embodiment illustrated in FIG. 4, the exchange field 406 is set to CME, the tradable object is defined as "ES DEC02," and the type of order 410 is a buy order.

According to one embodiment, a net position may be determined based on a difference between bought and sold quantities associated with the tradable object 408. Alternatively, the net position may be determined not only based on the filled buy and sell orders, but also based on any open positions held by a trader, e.g., any working buy and sell orders or the worst case condition where all orders that a trader has placed on the market getting filled. It should be understood that a trader or a system administrator may control which orders are taken into consideration for determining the net position. It should be understood that the present invention is not limited to the CME or ES DEC02, and any exchanges and any tradable objects could be defined as one of the filter criteria. Further, the present invention is not limited to buy or sell orders, and filters defining specific types of orders could also be used. For example, one or more filters with filter condition(s) may be configured for limit orders or stop orders.

In addition to filter criteria, a trader may also define filter conditions 404. The embodiment illustrated in FIG. 4 defines filter conditions using two variables, a limit condition and an override condition. Thus, according to one embodiment, a limit filter condition may correspond to the maximum order quantity that a trader is allowed to place in the market for any order satisfying the corresponding filter criteria. Then, when a trader places an order having the order quantity higher than the one defined in the limit condition, the override condition may define a value that can be used by the money management module 200 to override, e.g., change, the quantity of the order to be submitted to the exchange. Thus, for example, referring to the embodiment illustrated in FIG. 4, the limit condition that is placed on any ES DEC02 buy orders being placed to the CME is set to 5. Then, if a trader attempts to place a buy order matching the filter criteria defined in the first column of the filter criteria window 402, and having the order quantity set to over 5 lots, e.g. 6, the money management module 200 may override the order quantity of 6 with the order quantity of 5, thus, effectively limiting the quantity of the order to be submitted to the exchange based on the preset override conditions.

In the example embodiment, the override condition is preferably equal to the value in the limit filter condition. Further, alternatively, for training purposes, for example, an override condition may be set to "0" so that any time a trader attempts to place an order quantity that is higher than a maximum order quantity defined in the limit condition, that quantity may be overridden with the zero quantity thus preventing the trader from entering the order on the market. Further, alternatively, it should be understood that the override limit may be set to any quantity that is lower or higher than the quantity defined in the limit condition.

Further, as illustrated in FIG. 4, another filter criterion, such as, for example, a net position criterion may be added to the filter criteria described above thus effectively creating another filter. According to the filter criteria 402, if a trader attempts to place a buy order on CME for ES DEC02, and the trader's net position is equal to or exceeds the position of 15, the trader is prohibited from placing any more buy orders, thus, effectively limiting the trader from exceeding the preset maximum net position. In such an embodiment, the money management module 200 would prevent the order from being sent to the exchange.

Similarly, a trader or an administrator may define similar or different filter conditions for filter criteria associated with any sell orders being placed for the ES DEC02 on the CME. According to an example given in FIG. 4, the quantity-based limit and override conditions are set to 5 for sell orders, thus, effectively limiting the sell quantity to 5 lots. It should be understood that the limit and override conditions may be set to different values so that, for example, the quantity based limit condition may be set to 5, and the override condition may be set to 0 or to any other value. Similarly, another filter may be defined for the sell order related to the tradable object having the filter criteria described above plus a filter criterion based on the trader's net position. Based on the filter criteria defined in the money management interface 400, if a trader attempts to place on the CME an ES DEC02 sell order, and his/her net position is −15, the money management module 200 will prevent the order from being submitted to the exchange.

FIG. 4 illustrates four filters; however, it should be understood that more net position-related filters could also be defined so that, for example, if a trader's net position is close to the pre-configured maximum/minimum net position, the order quantity may be overridden with some intermediate quantity. Referring back to the example in FIG. 4, if a trader's net position is 10, and a trader attempts to place an order of 5, another filter may exist to override the quantity of 5 with a lower quantity, such as 3, for example. It should be understood that different embodiments are possible as well.

FIG. 5 is a block diagram illustrating another money management interface 500 through which a trader may establish price-based filters and filter conditions for buy orders. In the embodiment illustrated in FIG. 5, filter criteria 502 include an exchange type 506 (CME), a type of tradable object 508 (ES DEC02), and a range of buy price criteria, including the "Buy From" criterion 510 and "Buy To" criterion 512, via which a trader may define a price range for a given price-based filter. Thus, for example, based on the first filter defined in the money management interface 500, no quantity limits (identified as "−1" in the conditions 504) are set for any buy "ES DEC02" order that is placed on the CME under the price level of $1000.0. According to a second filter, if a trader attempts to buy the "ES DEC02" between the price levels $1000.0 and $1500.0, the money manager 200 will limit the order quantity to 5 lots. Further, according to the third filter, if a trader attempts to buy any quantity at a price level higher than $1500.0, the money manager module 200 will prevent such order from being sent to the exchange, and the trader will not be able to place such an order to the market.

FIG. 5 illustrates the outermost filter criteria with associated filter conditions. It should be understood, however, that more than three price-based filter criteria may be defined as well so that, for example, as a trader places orders closer to the maximum allowed price level, a trader may be allowed to trade lower quantities as the order prices increase. For example, a number of filters may be defined for a price range of $1000-$1500 so that for example, an override level for the $1000 price level may be set to 5, for the $1100 price level to 4, for the $1200 to 3, etc., until the $1500 price level is reached, and a trader is not allowed to place any buy orders above or equal to the $1500 price level.

The money management interface 500 illustrates a number of price-based filters restricting buy order quantities associated with "ES DEC02" buy orders being placed on the CME. However, it should be understood that the price-based filters are not limited to buy orders or to any specific tradable objects or exchanges. In another embodiment, a trader may define another set of price-based filters so that the money manager 200 will prevent a trader from placing any sell orders below the predefined price level.

Further, it should be understood that in addition to setting filter criteria and conditions statically, e.g., such as illustrated in FIGS. 4 and 5, the filter criteria and conditions may be defined using one or more trader-defined equations or formulas. Such equations may be based on one or more market-related or trader-related parameters. In one embodiment, a trader may define equations or formulas via any third party software application, such as a spreadsheet application, that may be linked to the money management module and the money management interface. In such an embodiment, every time a variable in any predefined equation changes, the spreadsheet application or any other third party software may dynamically calculate a new value for a filter condition or filter criterion associated with the equation.

Figure 6:
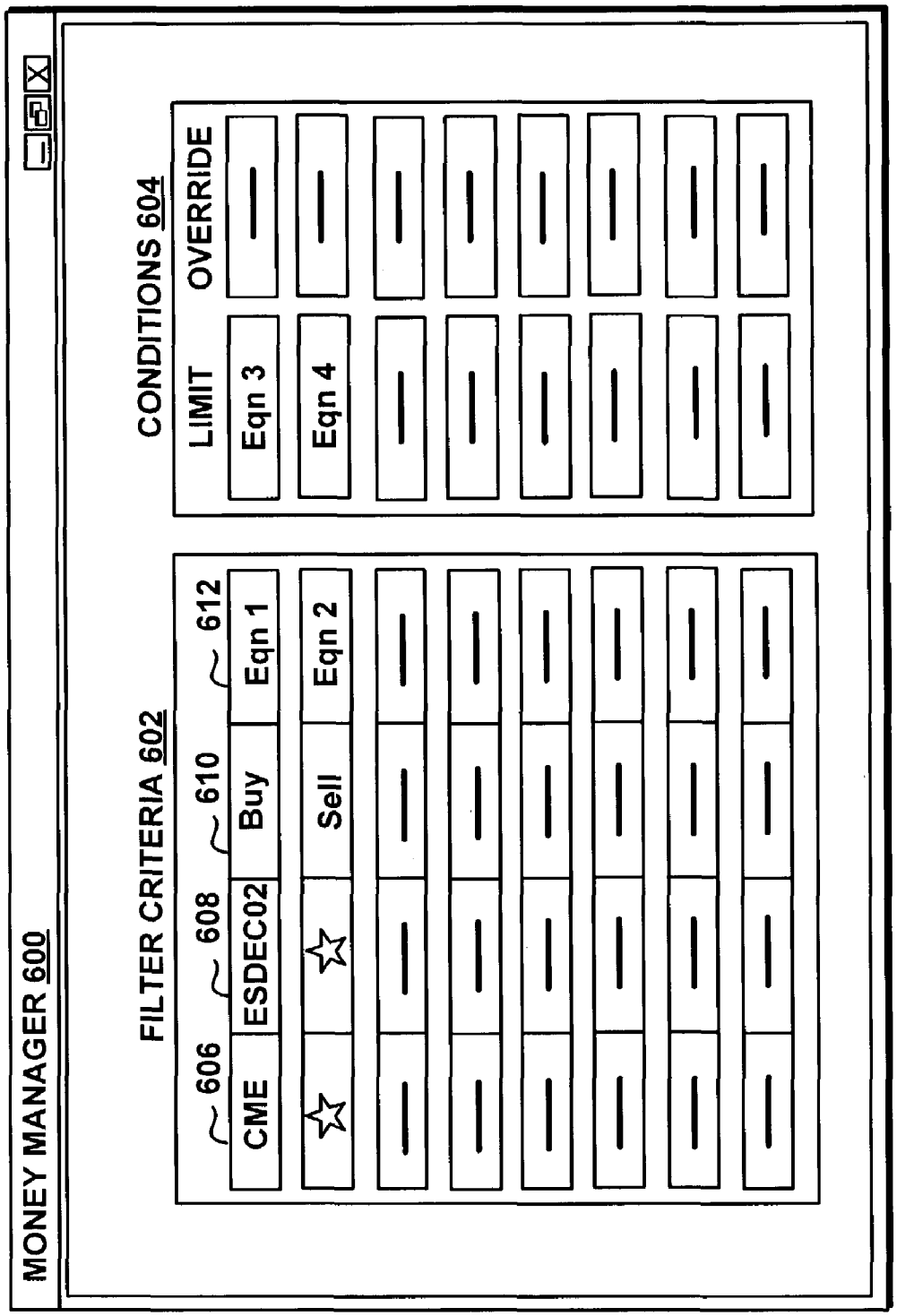
FIG. 6 is a block diagram illustrating one example money management interface through which a user can establish filter criteria and conditions using one or more equations.

FIG. 6 is a block diagram illustrating a money manager interface 600, via which a trader may define filter criteria and filter conditions using one or more user-defined equations or formulas. The money manager interface 600 defines two filters including a plurality of filter criteria 602 and filter conditions 604. The filter criteria 602 of the two filters in FIG. 6 include an exchange type 606 (CME), a name of tradable object (ES DEC02), and an order type (a buy and a sell). Further, one of the filter conditions in each filter is defined using an equation or a formula, e.g., an "Eqn 1" in the first filter associated with a buy order, and an "Eqn 2" in the second filter associated with a sell order. The filter conditions 604 could be also defined using one or more equations.

In the example money manager interface 600, "Eqn 3" may be used to calculate a limit quantity for the first filter, and "Eqn 4" may be used to calculate a limit quantity for the second filter. For example, a filter criterion equation may be based on tradable object related data, such as the last traded price associated with the ES DEC02, so that if the last traded price associated with ES DEC02 is lower than $1000.0, for example, Eqn. 3 may control the limit quantity of any ES DEC02 buy order that a trader may wish to place in the market. Further, for example, "Eqn 1" may include a condition determining if a trader placed the order at the inside market price level. Then, if the condition specified in "Eqn 1" is satisfied, "Eqn 3" may dynamically calculate a trader's net position and match it to a predetermined limit quantity level. Further, in such an embodiment, an override condition may be specified to override the order quantity that is higher than the maximum quantity determined based on the net position level.

Further, alternatively, one of the filter criteria equations can be based on moving average price calculations and the last traded price level. The moving price average may be calculated by determining the average price of a tradable object over a set number of time periods. For example, a 5-day moving average could be calculated by adding the closing prices for the last 5 days and dividing the total by 5. Alternatively, a 5-day moving average could be calculated by first determining an average of each day, and then using the calculated average to determine the moving price average for the last 5 days. It should be understood that different types of moving averages could be used, and the present invention is not limited to any types of moving averages or any method of calculation thereof. The moving averages may be considered as trend following indicators since the past price data is used to determine moving averages. Thus, the moving averages may be used to identify trend direction.

In one embodiment, for example, filter conditions, and specifically, order quantities, may be controlled based on a difference between the last traded price and the value associated with the moving average. In such an embodiment, instead of calculating the moving average price over a number of days, the moving average may be calculated throughout a day over a moving, user-configurable, time interval. In such an embodiment, a set of equations may control buy order quantities when the last traded price is higher than the corresponding moving average price level. For example, as the last traded price reaches a much higher level compared to the moving average, filter criteria may allow a trader to trade higher order quantities. Similarly, when the last traded price matches the moving average price and then decreases below that level, another filter criteria and filter conditions may exist that trigger a signal to sell, for example. In such an embodiment, as the last traded price level reaches a much lower price level compared to the moving average, the filter conditions may allow a trader to place higher sell order quantities and lower buy quantities. It should be understood that different embodiments are possible as well, and a trader may set a number of different filter criteria and filter conditions involving moving averages.

In addition to moving averages, other trend related indicators could be used as filter criteria. For example, a momentum value may be dynamically calculated by determining a net change of a tradable object's current price over a series of defined time periods. A positive momentum value typically indicates an upward movement, while a negative value indicates a downward movement. Additionally, filter criteria and filter conditions may be set using other trend related calculations, commonly known as trend oscillators, such as a Relative Strength Index ("RSI"), Stochastic Oscillator, or Moving Average Convergence/Divergence "MACD," for example. The RSI is an indicator that compares price movement of a tradable object to a mean value. The RSI may range from 0 to 100, and a tradable object may be considered overbought when the RSI reaches a predetermined level, such as 70, 80, or any other user configurable level. Using the RSI, a system administrator or a trader may set up a number of filters including filter conditions, defining different RSI levels, and corresponding filter criteria, limiting or increasing order quantities. In such an embodiment, for example, as the RSI reaches a predetermined level and continues to increase, the buy quantities that a trader is allowed to place in the market may be decreased accordingly. Likewise, if the RSI approaches a low level, such as 30, for example, it may be considered as a strong buying indicator. When such an RSI limit is reached, filer conditions may allow a trader to place higher buy quantities. Similar filter conditions may be created for the sell order quantities.

The stochastic oscillator is a momentum indicator that shows the location of the current close relative to a high/low range over a set number of periods. Similarly to the RSI, a trader may preset certain levels indicating a strong buy and sell indicator, and then may preset filter conditions limiting order buy/sell quantities that a trader is allowed to place on the market. The MACD is a momentum indicator that shows the relationship between two lines of average prices. The MACD may be calculated by subtracting a longer-term exponential moving average from a shorter-term exponential moving average. Another exponential moving average, often called a signal line, may be plotted above the MACD. A trader may configure filter criteria corresponding to signals generated by the MACD. For example, crossovers, when the MACD falls below the signal line, may signal a sell, in which case a buy quantity, defined in filter conditions, may be decreased and a sell quantity increased. Further, when the MACD rises above the signal line, such a condition may signal a buy, in which case a trader may be allowed to place higher buy order quantities. It should be understood that different trend indicators may be used as well, and the present invention is not limited to the examples given above. Further, it should be understood that a trader may combine a number of trend indicators into a single filter including a plurality of filter criteria related to trend indicators.

It should be understood that equations defining filter conditions may be based on any type of data including trader-related and market-related data being received from an exchange, and the market related data may be associated with one or more tradable objects. Further, it should be understood that a filter is not limited to a single criteria defined with an equation, and multi-level filter criteria defined with more than one equations or formulas could also be used in combination with one filter. Further, for example, the money manager module 200 may apply different formulas or equations based on, for example, time of day.

Further, as mentioned in the preceding paragraphs, filter criteria may be based on trader-related data such as trader's profit or loss information that may be dynamically calculated as a trader makes trades during a trading day. FIG. 7 is a block diagram illustrating a money manager interface 700, via which a trader may define filter criteria and filter conditions related to trader's profit and loss information. Once again, the example filter criteria 702 identify a name of an exchange 708 (the CME), a tradable object 710 (ES DEC02), a type of order activity 712 (a buy or a sell, in this example), and the trader's profit levels 714.

It should be understood that the trader's profit/loss may be calculated using many formulas. In one embodiment, for example, the trader's profit/loss may be calculated by subtracting the total sell price from the total buy price, and then subtracting any costs related to closing of trader's positions, market fees, or any other transaction costs. It should be understood that many different formulas could be used to calculate the profit/loss value, and the formulas may be user configurable. For instance, the cost to close a position may be calculated using different prices such as a current inside market price, a settlement price, or any other theoretical price selected by a trader. Additionally, exchange fees or any other user configurable fees could also be included into the profit related calculations.

According to an example embodiment illustrated in FIG. 7, the trader's profit filter conditions control and limit buy/sell order quantities. According to the filter criteria 702 and the profit filter conditions 704, as the trader's profit increases, the trader may submit higher quantity orders so that, for example, if a trader's profit is lower than $500.0, the trader is limited to trading a maximum of 3 lots. Thus, if a trader's profit is less than $500.0, and the trader attempts to place an order having the quantity higher than 3 lots, the money management module 200 will override the quantity specified by the trader with the quantity of 3.

As the trader's profit increases, a trader may place higher quantity orders. According to the embodiment illustrated in FIG. 7, once a trader reaches the profit of $500, the maximum quantity limit is increased to 5. Then, once the trader reaches the profit level of $1,000, $2,000, and $3,000, the maximum order quantities are increased to 7, 10, and 13, respectively. It should be understood that the filter criteria in FIG. 7 are only examples, and more or fewer filter criteria, e.g., for more or fewer profit levels may be created as well. For example, it should be understood that more filter criteria could be defined for the profit levels over $3,000.

Further, a trader or an administrator may define another set of filter criteria/conditions 706 that may be used to control and minimize the trader's losses. In such an embodiment, different filter criteria and conditions may be specified based on the trader's profit. As illustrated in FIG. 7, under the loss criteria/conditions 706, if a trader begins trading and his loss reaches −$100, the money management module 200 will not allow the trader to place any additional orders. Referring to the next filter criteria/conditions 706, if a trader reaches the profit of $500, and then starts losing the money, decreasing the profit to a loss stop level of less than $250, the money management module 200 will effectively stop/delete any orders that a trader attempts to place in the market thus effectively limiting the potential loss.

Similar loss filter criteria and conditions are defined for the $1000, $2000, and $3000 profit levels. Referring to these examples, as the trader reaches a higher profit level and then starts losing the money, the order quantities may be reduced as the trader reaches lower profit levels, and until a predetermined loss stop level is reached. For example, referring to FIG. 7, if a trader reaches a profit of over $2000, according to the filter conditions 704, a trader may submit order quantities of 10 and lower. However, once the trader reaches the $2,000 profit level and then starts losing the money and his/her profit decreases to a profit level of less than $1,500, the money management module 200, upon detecting such a condition, will decrease the maximum order quantity to 5. Once the $1,500 profit level is reached, and the trader continues to lose and reaches the profit level of less than $1,000, the money management module 200 may further limit the trader's maximum order quantity to 1. However, once the trader crosses the loss stop level, e.g. $750, in this example, the trader may no longer place any additional orders to the market, thus, effectively locking the profit to the loss stop level that has been predefined earlier.

In one embodiment, if a trader reaches a predetermined profit level such as $2,000, and then $3,000, the filter conditions 704 may control the quantity values that the trader may place in the market. However, once a trader reaches a predetermined profit level, e.g. $3,000, and then starts losing the money, thus, effectively decreasing the profit, the loss criteria/conditions 706 may control the maximum quantities that a trader is allowed to place in a market. It should be understood that once the trader reaches a predetermined profit level and then starts losing the money so that the conditions 706 are applied, the money management module 200 may apply the conditions 706 until the trader reaches the initial profit level, e.g., the highest profit level that has been reached before the trader started losing money. So that, for example, if a trader reaches a $3,000 profit level and then decreases his profit to a profit of less than $1,500 (e.g., with a maximum allowed order quantity of 5), and then once the trader starts increasing his profit and reaches a profit level between $1,500 and $2,000, the filter condition 706 (e.g., the maximum order quantity of 8), and not the filter condition 714 (e.g., the maximum order quantity of 10), may control the maximum order quantities that a trader is allowed to submit for each order. However, it should be understood that, in an alternative embodiment, the filter conditions 706 and 704 for the same profit levels may be set to the same quantities. Further, alternatively, once a trader starts making up the lost money, the filter conditions 704 may take precedence over the conditions 706.

Further, alternatively, once a trader starts making up the money, thus, effectively, increasing the profit, the money management module 200 may start applying filter conditions as if the trader has just started trading. For example, if a trader gets to a $2,000 profit level and falls back to $1,000, upon which he/she starts increasing the profit, the money management module 200 may start monitoring the profit from the $1,000 profit level as if the trader was starting from the $0. In such an embodiment, once a trader gets to the $1,500 profit level, the money management module 200 may use filter conditions and criteria 714, 704, as if the trader were at the $500 profit level. It should be understood that a trader or an administrator may control which filter conditions should be applicable.

Further, in addition to limiting order quantities, trader's profit or loss may limit other order-related or trader-related parameters. For example, in addition to limiting order quantities, the trader's profit or loss level may control a net position that the trader is allowed to hold until he/she reaches a higher/lower profit/loss level. It should be understood, and as explained in reference to FIG. 4, the net position may be calculated using different methods, such as user-defined methods. According to the preferred embodiment, the net position may be calculated based on any filled as well as working orders.

FIG. 8 is a block diagram illustrating an example money manager interface 800 via which a trader may define filter criteria related to quantities, a trader's net position, and filter conditions including trader's profit and/or loss. According to the embodiment illustrated in FIG. 8, the trader's profit level may not only control and limit the order quantities but also a trader's net position. For example, if a trader's profit reaches the $1,000 profit level, the first value (7, in this example), as defined in parenthesis under the limit conditions 804 in FIG. 8, defines a maximum quantity that a trader may place with any order. The second value defined in the same parenthesis (20, in this example) defines the maximum net position that a trader may hold at the $1,000 profit level. Thus, if a trader's profit level reaches $1,000, and a trader's net position reaches 20, the money manager module 200 will stop any new orders that a trader may attempt to place in the market until the trader's net position is lower than 20.

It should be understood, however, not illustrated in FIG. 8, that a trader could define loss criteria/conditions for each profit level defined under the filter criteria 802, such as the loss criteria/conditions defined in FIG. 7. However, in addition to defining quantity values for each profit level, a trader could also control the net position that a trader is allowed to hold as his/her profit decreases from a predetermined level. It should be understood that the present invention is not limited to controlling net position and quantities, and additional limits could also be defined for each profit level.

In an alternative embodiment, instead of using prefixed profit levels as marker points for determining a maximum quantity that a trader is allowed to trade, and then using the loss criteria conditions associated with the marker profit point, the loss criteria/conditions may be based on the current profit/loss associated with a trader. In such an embodiment, a tick loss that a trader is allowed to incur may be lowered. For example, assume a money management rule for a $500 profit level enables a trader to trade a maximum order quantity of 10 and to have a maximum net position of 20. Then, if a trader starts losing his/her money and reaches a profit level of 400, the loss criteria/conditions may allow a trader to trade the quantity of 5 and to hold a maximum net position of 10. Then, in such an embodiment, if a next profit level, e.g., a marker point, for a trader's profit is set to a level of $1,000, even if a trader's profit reaches a profit level of $999, according to the preset rules, the trader is only allowed to trade and hold the net position as set by the $500 profit level. However, in such an embodiment, a trader is allowed to incur a loss of 500 ticks between his current profit of $999 and the next loss cut off level of $400.

Therefore, to avoid a situation described above, the loss criteria/conditions may be based on a trader's current profit/loss. Subsequent figures illustrate two example money management interfaces via which an administrator may control and configure money management rules for a trader.

FIG. 9 is a block diagram illustrating a money management interface 900 via which a trader may define filter criteria for controlling order quantities and a trader's net position that a trader is allowed to hold based on a trader's current profit/loss instead of a prefixed market profit position that the trader has reached. FIG. 9 illustrates only a few levels of profit conditions with associated loss criteria/conditions; however, it should be understood and as has been mentioned in relation to earlier figures, a trader may define more profit levels and loss criteria/conditions associated with each profit level.

As illustrated in FIG. 9, the money management interface defines a number of filter criteria 902, profit conditions 904, and loss criteria/conditions 906. Unlike the example in FIG. 7, however, the loss conditions 906 are based on the current profit level associated with the trader. For example, if a trader's profit is between the $500 and $1,000 profit levels, the $500 profit level may be used as the marker profit level, and a trader may trade a maximum order quantity of 10, and also may hold a maximum position of 20. However, once a trader reaches a profit level that is 20% lower than his best profit level that falls between the $500 marker and the $1,000 marker, the loss conditions will limit the maximum order quantity to 5 and the current net position to 10. If the trader keeps losing the money and reaches a profit level equal to the 50% of his initial best profit level, e.g., before he/she started losing money, the loss conditions may place further limits on the trader, e.g., 5 for the maximum quantity and 0 for the net position. Similar loss criteria/conditions may be applied once a trader reaches a $1,000 profit level or higher profit levels, not illustrated in FIG. 9. Referring back to the example provided above for the $999 profit level, and using the embodiment of FIG. 9, once the trader loses a 20% of his best profit level, $999 in this example, and reaches a profit level of about $800, the trader is allowed to incur a loss of 200 ticks, thus, a significantly lower profit loss compared to the example above of 500 ticks.

FIG. 10 is a block diagram illustrating another example money manager interface 1000 via which a trader may define filter criteria for controlling order quantities and a trader's net position that a trader is allowed to hold based on a trader's best profit/loss according to another example embodiment.

The money manager interface 1000, similarly to the interfaces illustrated in earlier figures, allows a trader to define filter criteria 1002, profit conditions 1004, and loss criteria/conditions 1006. According to the embodiment illustrated in FIG. 10, the loss criteria/conditions 1006 are based on an offset, e.g., a difference, between the trader's current profit level and the trader's profit reached before the trader started losing his/her money. Referring back to the $999 profit level example, once the trader reaches the $500 profit level and then keeps increasing his profit to $999, at which point he/she starts losing the money, the $500 filter criterion still applies since the trader has not reached the next profit level of $1,000. However, the loss criteria/conditions may be measured based on the $999 profit level and not static or prefixed conditions as in the example given in reference to FIG. 9, such as a $400 profit level, etc. Thus, once the trader's profit ($999) is offset by $100, the trader's maximum order quantity and net position are decreased to 5 and 10, respectively. Referring back to the example provided above for the $999 profit level, and using the embodiment of FIG. 10, once the trader's initial profit is offset by 100, and reaches the $899 profit level, the trader is allowed to incur a loss of 100 ticks, instead of 200 ticks, as in the example provided in reference to FIG. 9.

Further, as mentioned in the preceding paragraphs, an administrator may configure and manage money management rules for a plurality of traders so that each trader may be associated with a different set of money management rules. Using such a method, more experienced traders may be allowed to trade higher quantities or may be allowed to hold higher net positions as compared to less experienced traders.

Figure 11:
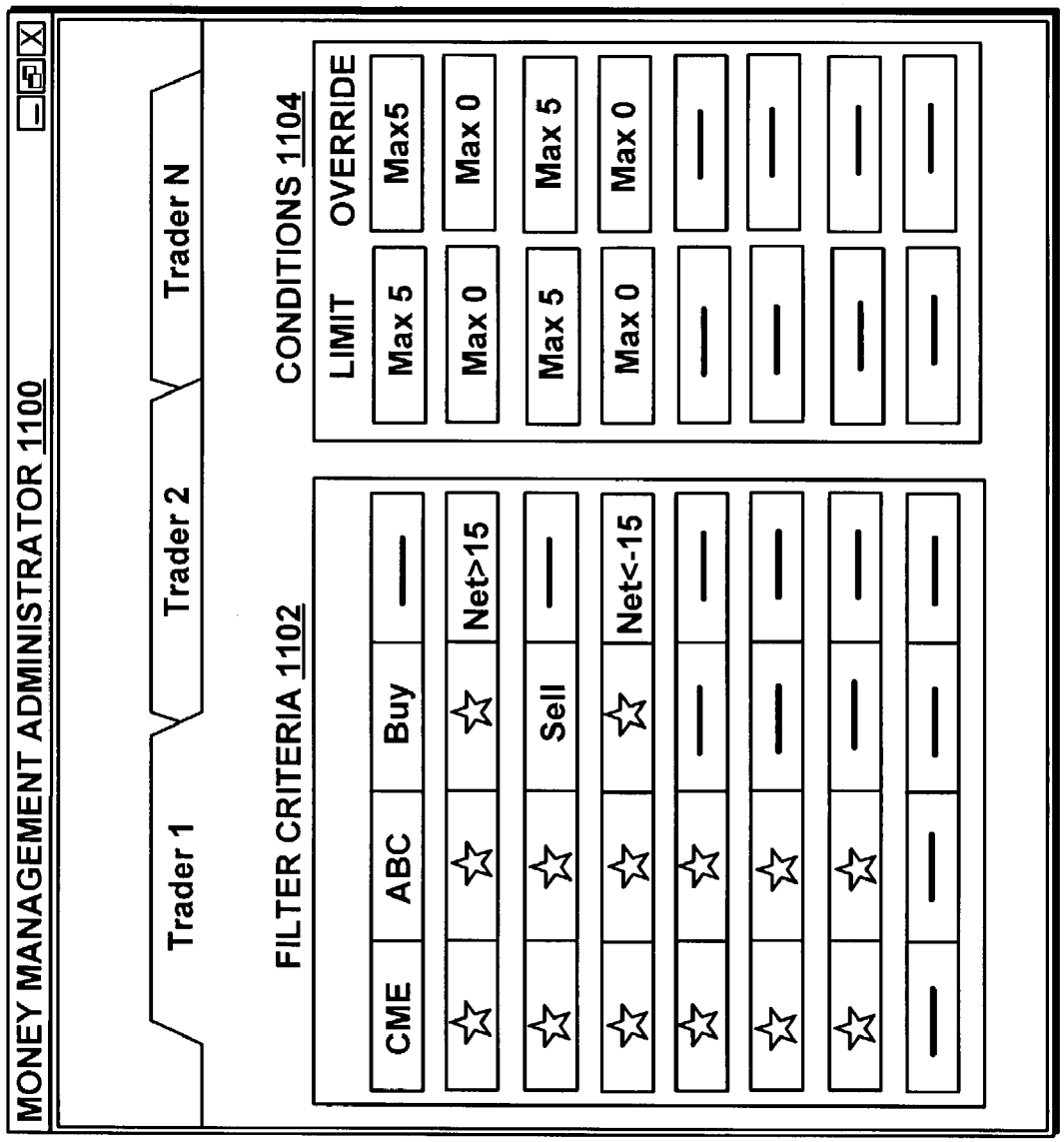
FIG. 11 is a block diagram illustrating another example money management interface via which an administrator may control and configure a plurality of filter conditions and filter criteria for a plurality of traders.

FIG. 11 is a block diagram illustrating a money management administrative interface 1100 via which an administrator may control and configure money management rules for a plurality of traders. As illustrated in FIG. 11, the interface 1100 allows an administrator to select a predetermined trader using one of the tabs, three of which, labeled "Trader 1," "Trader 2," and "Trader N," respectively, are illustrated in FIG. 11. It should be understood that more than three tabs could be displayed via the interface 1100, and the text displayed on each tabs may be user-configurable. For example, instead of labeling each tab with a number, an administrator could instead input a name of each trader. Further, it should be understood that the filter criteria and conditions illustrated in FIG. 11 are only examples, and more filter conditions, such as those illustrated in FIGS. 4-10, or others, could be defined for each trader. Further, in an alternative embodiment, each trader may be associated with multiple sets of filter criteria and conditions. In such an embodiment, each set of filter criteria and conditions may be set for a predetermined trading type or scheme, such as spread trading or any other type of trading that a trader is or might be involved in.

Further, it should be understood that the money management interface 1100 may have a different format. For example, a number of columns could be used to define each trader and a plurality of rows could be used to define filter criteria and filter conditions. Further, it should be understood that instead of defining a number of filters for each trader, a system administrator may define a plurality of filters for a group of traders, such as traders working for a predetermined company. In such an embodiment, a centralized money management module may be placed on a gateway or other network entity, and may control and monitor performance or other predefined parameters associated with a group of traders. Further, such a money management module may dynamically change or modify filter conditions or filter criteria for one or more traders in the group based on, for example, performance of the entire group of traders. For example, a system administrator may preconfigure a set of rules and filter criteria/condition that when satisfy may trigger certain changes to be performed to filters being applied by localized (e.g. on client device) money management modules. It should be understood that different embodiments are possible as well.

It should be understood that the above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

Further, it will be apparent to those of ordinary skill in the art that methods involved in the system and method for money management in an electronic trading environment may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

Further, the claims should not be read as limited to the described order or elements unless stated to that effect. Therefore, all embodiments that come within the scope and spirit of the following claims and equivalents thereto are claimed as the invention.

What is claimed is:

1. A method for managing electronic trades for a tradeable object, comprising:

receiving a request to submit an order to buy or sell a quantity of a tradeable object at a price to an electronic exchange via a user input device associated with a computing device;

responsive to the request and prior to sending the order to the electronic exchange, monitoring the order via the computing device to determine whether a user-defined money management filter corresponding to the order matches the order, the user-defined money management filter having a user-defined filter condition for modifying an order parameter of the order;

identifying a match between the money management filter and the order via the computing device;

in response to identifying, modifying, via the computing device, the order parameter of the order according to the filter condition of the money management filter, the order parameter of the order being modified to a modified order quantity; and sending the order with the modified order quantity at the price to the electronic exchange, via the computing device.

2. The method of claim 1 where the user-defined money management filter further comprises at least one user-defined filter criteria, and where identifying includes determining that the at least one user-defined filter criteria matches the order.

3. The method of claim 2 where the at least one user-defined filter criteria comprises at least one trader-related criteria.

4. The method of claim 3 where the at least one trader-related criteria comprises a dynamically determined trader-related criteria.

5. The method of claim 3 where the at least one trader-related criteria comprises at least one trader performance related criteria.

6. The method of claim 5 where the at least one trader performance related criteria comprises at least one trader's profit related criteria.

7. The method of claim 2 where the at least one filter criteria comprises at least one market data related criteria.

8. The method of claim 1 where modifying comprises changing the quantity of the tradeable object of the order to a lower quantity value.

9. The method of claim 1 further comprising determining the at least one user-defined filter condition according to a user-defined formula.

10. The method of claim 1, further comprising preventing the order from being sent to the electronic exchange prior to sending the order to the electronic exchange in response to identifying.

11. A computer readable medium having instructions stored thereon executable by a processor for carrying out acts comprising:
receiving a request to submit an order to buy or sell a quantity of a tradeable object at a price to an electronic exchange via a user input device associated with a computing device;
responsive to the command and prior to sending the order to electronic exchange, monitoring the order via the computing device to determine whether a user-defined money management filter corresponding to the order matches the order, the user-defined money management filter having a user-defined filter condition for modifying an order parameter of the order;
identifying a match between the money management filter and the order via the computing device;
in response to identifying, modifying, via the computing device, the order parameter of the order according to the filter condition of the money management filter, the order parameter of the order being modified to a modified order quantity; and
sending the order with the modified order quantity at the price to the electronic exchange, via the computing device.

12. The computer readable medium of claim 11 where the user-defined money management filter further comprises at least one user-defined filter criteria, and where identifying includes determining that the at least one user-defined filter criteria matches the order.

13. The computer readable medium of claim 12 where the at least one user-defined filter criteria comprises at least one trader-related criteria.

14. The computer readable medium of claim 13 where the acts further comprise dynamically determining the at least one trader-related criteria.

15. The computer readable medium of claim 13 where the at least one trader-related criteria comprises at least one trader performance related criteria.

16. The computer readable medium of claim 15 where the at least one trader performance related criteria comprises at least one trader's profit related criteria.

17. The computer readable medium of claim 11 where modifying comprises changing the quantity of the tradeable object of the order to a lower quantity value.

18. The computer readable medium of claim 11 where the acts further comprise determining the at least one user-defined filter condition according to a user-defined formula.

19. The computer readable medium of claim 11, where the acts further comprise preventing the order from being sent to the electronic exchange prior to sending the order to the electronic exchange in response to identifying.

* * * * *